United States Patent
Campinos et al.

(10) Patent No.: US 6,266,415 B1
(45) Date of Patent: *Jul. 24, 2001

(54) PROCESS FOR PROTECTING AN INFORMATION ITEM TRANSMITTED FROM A SECURITY ELEMENT TO A DECODER AND PROTECTION SYSTEM USING SUCH A PROCESS

(75) Inventors: Arnaldo Campinos, Paris; Jean-Bernard Fischer, Rennes, both of (FR)

(73) Assignee: Thomson multimedia S.A., Boulogne Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,140

(22) Filed: Nov. 12, 1997

(30) Foreign Application Priority Data

Nov. 13, 1996 (FR) .................................................. 96 13822

(51) Int. Cl.$^7$ ...................................................... H04L 9/00
(52) U.S. Cl. ............................................ 380/247; 235/380
(58) Field of Search ....................... 380/25, 247; 235/380

(56) References Cited

U.S. PATENT DOCUMENTS 4,295,039 * 10/1981 Stuckert ............................... 235/380
5,703,951 * 12/1997 Dolphin ................................. 380/25
5,721,781 * 2/1998 Deo et al. .............................. 380/25
5,870,476 * 2/1999 Fischer .................................. 380/24

FOREIGN PATENT DOCUMENTS 0471 373  2/1992 (EP) .
96/06504  2/1996 (WO) .

OTHER PUBLICATIONS

J.Giachetti/V.Lenoir/A.Codet/D.Cutts/J.Sager; A Common Conditional Access Interface for Digital Video Broadcasting Decoders; "IEEE Transactions on Consumer Electronics", vol. 41, No. 3, Aug. 1994, pp. 836–841.

* cited by examiner

Primary Examiner—Thomas R. Peeso
Assistant Examiner—Todd Jack
(74) Attorney, Agent, or Firm—J. S. Tripoli; E. P. Herrmann; D. T. Shoneman

(57) ABSTRACT

The invention relates to a process for protecting an information item transmitted from a security element to a decoder and a protection system using such a process.

The information item is protected by encrypting within the security element the information item to be transmitted to the decoder and by decrypting this information item within the decoder.

The invention applies to conditional-access systems.

10 Claims, 4 Drawing Sheets

PROCESS FOR PROTECTING AN INFORMATION ITEM TRANSMITTED FROM A SECURITY ELEMENT TO A DECODER AND PROTECTION SYSTEM USING SUCH A PROCESS

BACKGROUND OF THE INVENTION

The invention relates to a process for protecting an information item transmitted from a security element such as, for example, a user-card of a conditional-access system, to a decoder.

The invention applies more particularly to conditional-access systems for which the descrambling operation is performed in the security element which is then, for example, a PCMCIA type card complying with the interface standard known by those skilled in the art as "CENELEC/DVB-Common Interface" or a chip card complying with the American NRSS standard (standing for "National Renewable Security System").

The invention applies to any type of conditional-access system, whether this system be of the on-line type or the standalone type.

In an on-line conditional-access system, the scrambled information item is an information item consisting of a signal distributed simultaneously to various users.

In a standalone conditional-access system, the scrambled information item is contained on standalone information media such as, for example, compact discs or digital video discs.

The information item making up the various programmes originating from the issuing source, such as, for example, a service provider, is transmitted to the security element. The security element descrambles the programme selected by the user (provided that the user's entitlements are present in the security element) and sends this programme, as well as the other programmes which have remained unchanged, to the decoder.

Such a process has the drawback that the programme selected by the user is transmitted unenciphered.

Such a transmission can readily be exploited by a pirate who can use it to distribute the pirated programme illegally.

FIG. 1 represents the schematic of a security element/decoder assembly according to the prior art.

The system of FIG. 1 comprises an information source I, a decoder 6 and a security element 1.

The decoder comprises a demodulation device 7 and a demultiplexing and decoding device 8.

The security element 1 contains a filtering device 2, a descrambling device 3, an access control device 4 and a user entitlement storage device 5.

The information item I issued by the issuing source contains one or more multiplexed programmes, for example, according to the MPEG-2 transport standard (standing for "Moving Picture Expert Group").

As is known to those skilled in the art, the programmes output by the issuing source are scrambled programmes. The information item I contains, in messages which will hereafter be denoted ECM, the encrypted control words allowing, after decryption, the descrambling of the scrambled programmes.

After the decoder receives the information item I, the latter is demodulated by the device 7 and then transmitted in full to the security element 1. The latter filters, with the aid of the device 2, the ECMs (denoted ECMA in FIG. 1) corresponding to the programme selected by the user and transmits them to the device 4 for processing. The non-filtered part of the information item is transmitted without modification to the descrambler 3. The device 4 carries out the conventional functions for processing the ECMs, and, in particular, decrypts the control words CWi which they contain, provided that the entitlements D necessary for descrambling the selected programme and output by the device 5 are applied to the device 4.

The control words CWi are subsequently transmitted to the descrambling device 3 which uses them to descramble the programme selected by the user. The information item output by the descrambler 3 is transmitted to the demultiplexing and decoding device 8 so as to generate the usable, i.e., for example, displayable in the case of a film, information item ECG1.

SUMMARY OF THE INVENTION

The invention does not have this drawback.

The invention relates to a process making it possible to transfer from a security element to a decoder a stream of data arising from a descrambler included within the security element. The process comprises a first step making it possible to encrypt, in the security element, the information item arising from the descrambler under the action of a first encryption key and a second step making it possible to decrypt, in the decoder, the encrypted information item arising from the first step, under the action of a second encryption key.

The invention also relates to a security element containing a descrambler making it possible to descramble the information item which it receives under the action of control words. The security element comprises a device for encrypting the descrambled information item arising from the descrambler under the action of a first encryption key.

The invention also relates to a decoder making it possible to decode data arising from a security element, the said data representing at least one programme selected by a conditional-access system user. The decoder comprises a decryption device making it possible to decrypt, under the action of a second key, the data arising from the security element, the said data being data which are descrambled and encrypted under the action of a first key.

The invention further relates to an assembly made up of a security element and of a decoder. The security element is a security element according to the invention such as that mentioned above and the decoder is a decoder according to the invention such as that mentioned above.

As has been mentioned earlier, an advantage of the invention consists in protecting the transmission of the programme selected by the user from the security element to the decoder.

Other characteristics and advantages of the invention will emerge on reading embodiments of the invention given with reference to the appended figures in which:

BRIEF DESCRIPTION OF THE DRAWINGS

In all the figures, the same labels denote the same elements.

DESCRIPTION OF THE PREFERRED EMBODIMENTS

Figure 2:
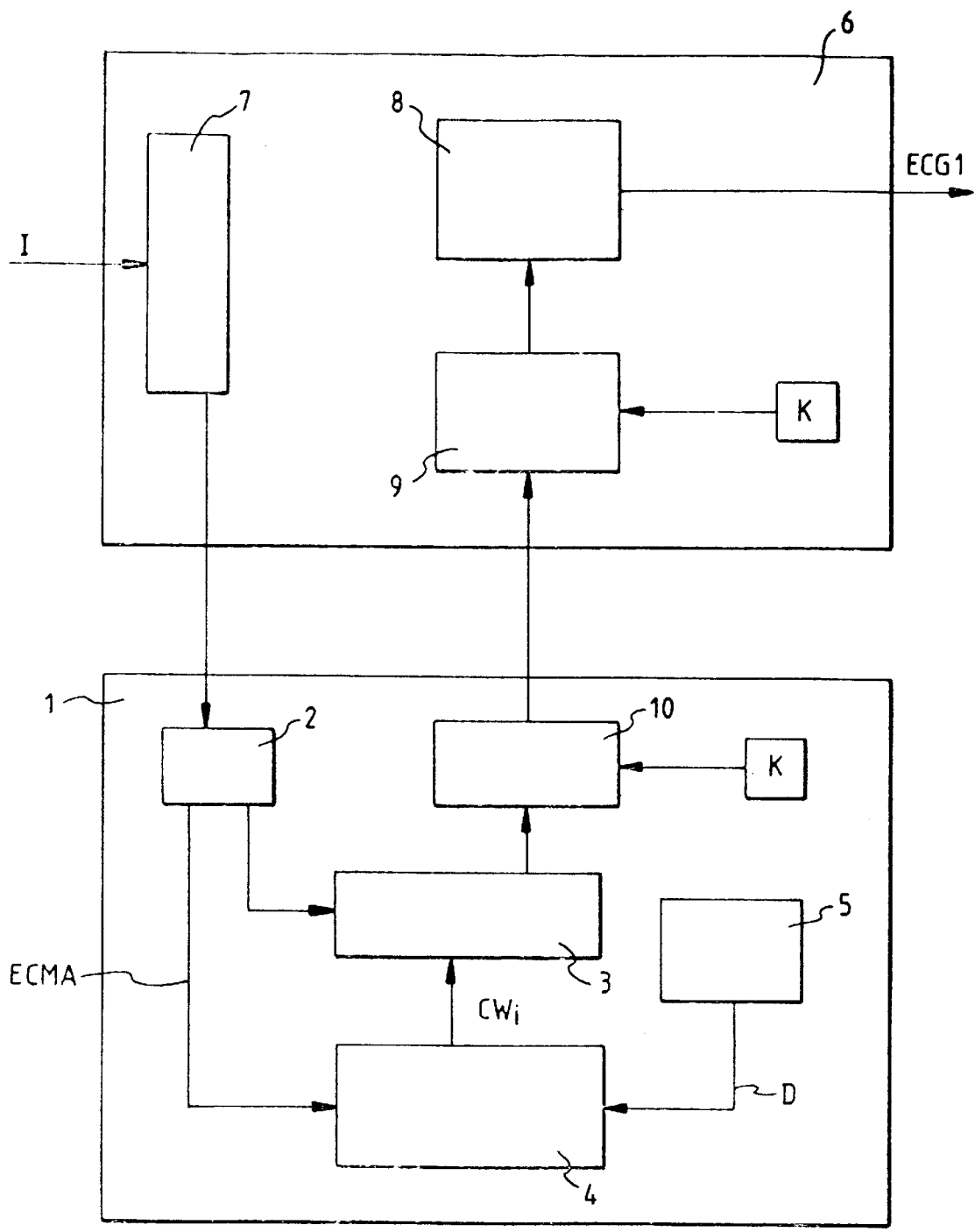
FIG. 2 represents the schematic of a security element/decoder assembly according to a first embodiment of the invention.

FIG. 2 represents the schematic of a security element/decoder assembly according to a first embodiment of the invention.

Figure 1:
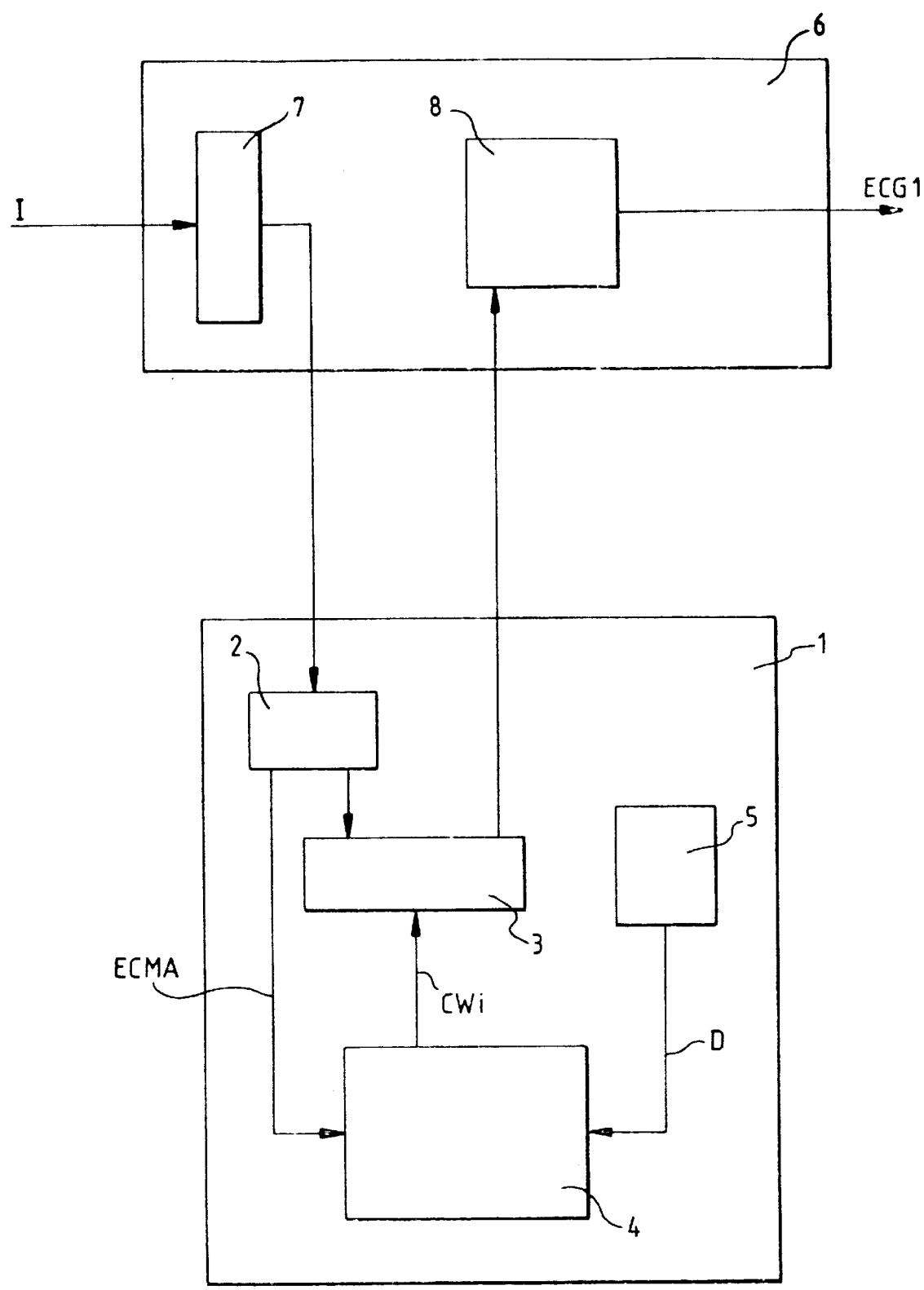

In addition to the elements described in FIG. 1, the decoder 6 comprises a decryption device 9 and the security element 1 comprises an encryption device 10. The programme selected by the user is encrypted by the device 10 using an encryption key K. Conversely, the device 9 decrypts the programme with the help of the same key K. Advantageously, this avoids having transmission of the programme unenciphered between the security element and the decoder.

According to the invention, the encryption and decryption key K can be common to all the security element/decoder pairs, but can also be specific to each pair or group of security element/decoder pairs. Advantageously, the production of pirate clones of security elements is thereby impaired.

Thus, this technique forces pirates to customize each of their clones on the basis of the decoder to which they are connected. This has the consequence of complicating their task and hence of reducing the rewards which they may derive from piracy.

According to a particular implementation of the embodiment of FIG. 2, a public key algorithm can be used for the devices 9 and 10. In this case, the encryption key is different from the decryption key and, in a preferred manner, the secret key is used for encryption in the security element while the public key is used for decryption in the decoder.

According to this first embodiment of the invention, the key K is a key stored permanently both in the security element and in the decoder.

Figure 3:
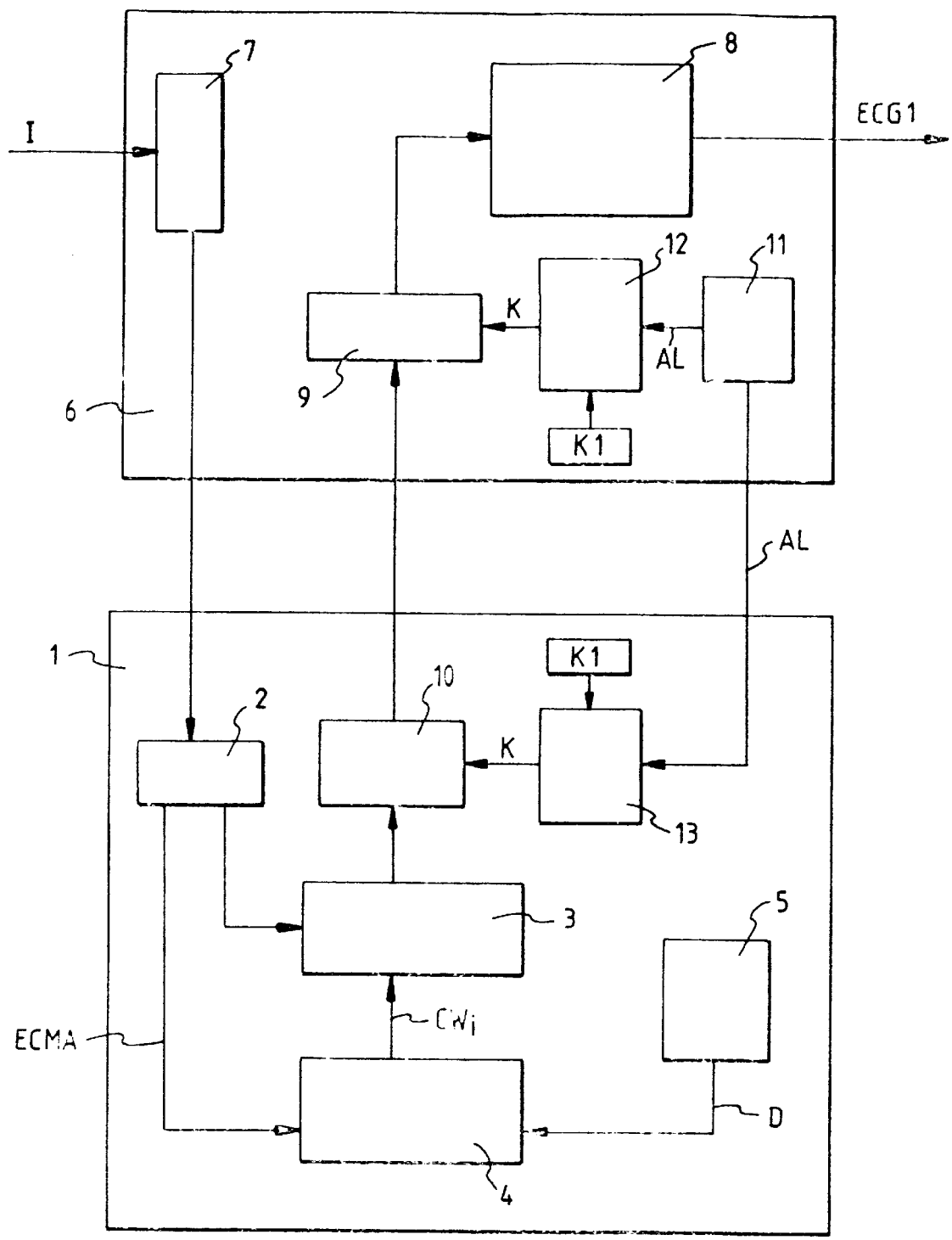
FIG. 3 represents the schematic of a security element/decoder assembly according to a second embodiment of the invention.

FIG. 3 represents the schematic of a security element/decoder assembly according to a second embodiment of the invention.

In addition to the elements described in FIG. 2, the decoder comprises a device 11 for generating a random number or random words AL and a device 12 for generating decryption keys and the security element comprises a device for generating encryption keys 13.

Instead of using a fixed key K, as in FIG. 2, the encryption and decryption keys are here generated dynamically. To do this, the decoder 6 generates a random number AL by way of the device 11 and transmits it to the device 13 of the security element. Moreover, the device 11 transmits the random number to the device 12. The latter encrypts the random number AL under the action of a key K1 so as to give the decryption key K. In the same way, the device 13 of the security element encrypts the random number under the action of a key K1 and produces the encryption key K.

According to a particular embodiment of the invention, described in FIG. 3, the encryption algorithm used by the devices 12 and 13 can be replaced by a "one-way" function with key K1. Such a function is for example described in the European patent application filed under number 96401336.1-2209.

Advantageously, the devices 12 and 13 prevent any pirate from discovering the encryption/decryption key K solely through the data item AL which travels between the decoder and the security element.

According to another particular embodiment of the invention, the key K1 used by the devices 13 and 12 can be specific to the security element/decoder pair, thus exhibiting the advantages mentioned earlier.

According to another particular advantageous embodiment of the invention, the procedure for generating the encryption and decryption key K can be renewed each session or else several times per session. Session should be understood to be an uninterrupted sequence of reception of one and the same programme by a user.

These renewals of the keys K exhibit, among other things, the following benefits:
  on the one hand, they make it possible to increase the soundness of the encryption/decryption algorithm of the devices 9 and 10. Soundness of the algorithm should be understood to be the resistance of the algorithm to piracy by cryptanalysis.

The frequency of renewal of the keys directly influences the amount of data encrypted with the same key made available to a pirate so as to cryptanalyse the algorithm. Since limiting this amount increases the resistance of the algorithm to attacks, frequent renewals of the key K increase the soundness of the encryption/decryption algorithm of the devices 9 and 10.
  on the other hand, it makes it possible to avoid replaying previously selected programmes.

Thus, if an ill-intentioned user or a pirate records the information output by the device 10, and therefore records, at the instant t, the selected programme in a form encrypted with a key denoted $K_t$, he will not be able to use the said programme subsequently since the decryption key at the instant t+Δt, denoted $K_{t+\Delta t}$, will be different from the encryption key $K_t$.

Figure 4:
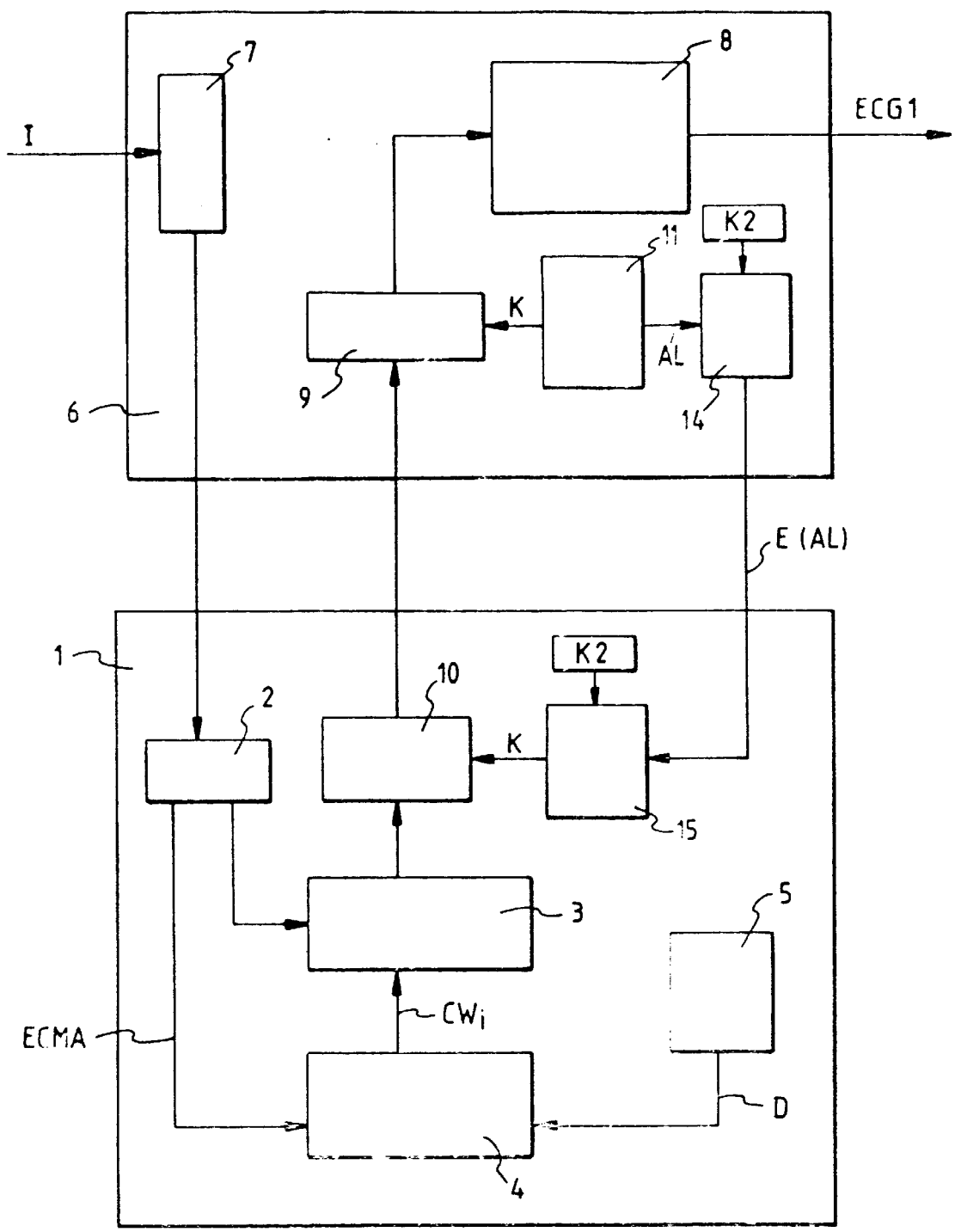
FIG. 4 represents the schematic of a security element/decoder assembly according to a third embodiment of the invention.

FIG. 4 represents the schematic of a security element/decoder assembly according to a third embodiment of the invention.

In addition to the elements described in FIG. 2, FIG. 4 includes, in respect of the decoder, a random number generator 11 and an encryption device 14 and, in respect of the security element, a decryption device 15.

The generator 11 generates a random number AL which is used directly as decryption key K by the device 9. Moreover, the random number AL is transmitted to the device 14 which encrypts it and transmits it to the device 15 of the security element. The encryption performed by the device 14 is performed under the action of a key K2. On the security element side, the encrypted random number E(AL) is decrypted by the device 15 under the action of a key K2 and the result AL is transmitted to the device 10 so that it serves as encryption key K.

According to another embodiment of the invention, a public key algorithm can be used for the devices 14 and 15. In this case, the encryption key is different from the decryption key and, in a preferred manner, the secret key is used for decryption in the device 15 whilst the public key is used for encryption in the device 14.

Advantageously, the devices 14 and 15, whether they use a symmetric algorithm or a public key algorithm, prevent any pirate from discovering the encryption/decryption key K merely by knowing E(AL).

According to the particular embodiments of the invention which were mentioned earlier:
  the random number AL can be generated once per session or indeed several times during the same session;
  the encryption/decryption key K2 used by the devices 14 and 15 can be made specific to the security element/decoder pair, thus exhibiting the abovementioned advantages.

In the context of the invention, for all the embodiments described in FIGS. 2, 3 and 4, the choice of the encryption/decryption algorithm of the devices 9 and 10 results from a compromise between the desired level of protection of the programmes and the complexity of the algorithm implemented in the decoder and in the security element.

Thus, a symmetric algorithm which is simple to implement via a dedicated circuit is preferred. Such an arrangement makes it possible, advantageously, to reduce the cost of implementation and to ensure high encryption/decryption rates, for example of the order of about ten Megabits per second. Renewal of the encryption keys then advantageously allows the use of a simple algorithm while decreasing the risks of piracy by cryptanalysis.

Furthermore the systematic decryption performed by the device 9 of the decoder exhibits a particular benefit, viz. that the user can display, via the decoder, only the programmes originating from the security element. This implies, for example, that unenciphered pirate programmes may not be played on the decoder alone.

In the case in which the keys K1, K2 are specific to each security element/decoder pair, the abovementioned property of systematic decryption has an additional advantage, viz. of preventing any pirate from supplying the same programme to decoders which are different from the decoder which he has pirated.

Moreover, for all the embodiments of the invention described in FIGS. 2, 3 and 4, the implementation consisting in integrating the devices 8 and 9 into the same electronic circuit will be preferred. This is so as to preclude the contents of the selected programme from appearing unenciphered between the two devices.

What is claimed is:

1. A method for protecting a stream of data output from a security element comprising:

receiving a signal scrambled using control words from a source external to said security element, said scrambled signal comprising a data component and a control component;

generating a control word in response to said control component of the scrambled signal;

descrambling said data component using said control word to generate a descrambled data component;

encrypting said descrambled data component using a first key to generate a re-encrypted data component; and providing said re-encrypted data component to said external source.

2. The method according to claim 1, further comprising, before the step of encrypting said descrambled data component, the steps of:

receiving data from said external source; and encrypting said data using a second key to generate said first key.

3. The method according to claim 2, wherein said data received from said external source is firstly generated by a random number generator.

4. The method according to claim 1, further comprising, before the step of encrypting said descrambled data component, the steps of:

receiving encrypted data from said external source; and decrypting said encrypted data using a second key to generate said first encryption key.

5. The method according to claim 4, wherein said encrypted data received from said external source is firstly generated by a random number generator and secondly encrypted using a third key.

6. A method for protecting a stream of data received from an external security element comprising:

providing a signal scrambled using control words to said external security element, said scrambled signal having a data component and a control component, said security element generating a control word in response to said control component of the received scrambled signal and descrambling said data component using said control word to generate a descrambled data component;

said security element further encrypting said descrambled data component using a first key to generate a re-encrypted data component; and receiving said re-encrypted data component from said external security element.

7. The method according to claim 6, further comprising, before the step of receiving said re-encrypted data component, the steps of:

generating a random number; and providing said random number to said external security element;

wherein said security element encrypts said random number using a second key to generate said first key.

8. The method according to claim 7, further comprising:

encrypting said random number using a third key to generate a decryption key; and decrypting said re-encrypted data component using said decryption key.

9. The method according to claim 6, further comprising, before the step of receiving said re-encrypted data component, the steps of:

generating a random number;

encrypting said random number using a second key; and providing said encrypted random number to said external security element;

wherein said security element decrypts said encrypted random number using a third key to generate said first key.

10. The method according to claim 9, further comprising:

decrypting said re-encrypted data component using said random number.

* * * * *